United States Patent
Park et al.

(10) Patent No.: US 10,000,202 B2
(45) Date of Patent: Jun. 19, 2018

(54) DEVICE AND METHOD FOR CONTROLLING RUNNING MODE OF HYBRID ELECTRIC VEHICLE

(71) Applicants: Hyundai Motor Company, Seoul (KR); Kia Motors Corporation, Seoul (KR)

(72) Inventors: Joonyoung Park, Seoul (KR); Sang Joon Kim, Seoul (KR); Jonghan Oh, Gyeonggi-Do (KR); Yong Seok Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 146 days.

(21) Appl. No.: 14/922,129

(22) Filed: Oct. 24, 2015

(65) Prior Publication Data

US 2016/0375895 A1   Dec. 29, 2016

(30) Foreign Application Priority Data

Jun. 29, 2015   (KR) .......................... 10-2015-0092457

(51) Int. Cl.
*B60L 9/00* (2006.01)
*B60L 11/00* (2006.01)
(Continued)

(52) U.S. Cl.
CPC .......... *B60W 20/40* (2013.01); *B60L 11/1861* (2013.01); *B60W 10/06* (2013.01); *B60W 10/08* (2013.01); *B60W 10/26* (2013.01); *B60W 20/13* (2016.01); *B60K 2006/4825* (2013.01); *B60L 2260/26* (2013.01); *B60W 2400/00* (2013.01); *B60W 2510/086* (2013.01); *B60W 2510/242* (2013.01); *B60W 2510/244* (2013.01); *B60W 2710/06* (2013.01); *Y02T 10/6252* (2013.01); *Y02T 10/6286* (2013.01); *Y10S 903/93* (2013.01)

(58) Field of Classification Search
CPC ...... B60W 20/40; B60W 20/13; B60W 10/06; B60W 2510/242; B60L 11/1861
USPC .......................................................... 701/22
See application file for complete search history.

(56) References Cited

U.S. PATENT DOCUMENTS

| | | | |
|---|---|---|---|
| 5,632,238 A | 5/1997 | Furukawa et al. | |
| 7,107,956 B2* | 9/2006 | McGee | B60K 6/445 |
| | | | 123/179.3 |
| 2015/0048802 A1* | 2/2015 | Tani | B60L 11/1857 |
| | | | 320/149 |

FOREIGN PATENT DOCUMENTS

| | | |
|---|---|---|
| EP | 2559578 A1 | 2/2013 |
| JP | 2009/248732 A | 10/2009 |

(Continued)

OTHER PUBLICATIONS

Extended European Search Report for European Patent Application No. 15190837.3, dated Nov. 25, 2016, 8 pages.

*Primary Examiner* — Isaac G Smith
(74) *Attorney, Agent, or Firm* — Mintz Levin Cohn Ferris Glovsky and Popeo, P.C.; Peter F. Corless (57) ABSTRACT

A method and device for controlling a running mode of a hybrid vehicle are provided. The method includes monitoring power consumption of a battery when the hybrid vehicle is driven in an electric vehicle (EV) mode and calculating a threshold value for starting an engine. Then, whether to change the running mode of the hybrid vehicle is determined using the power consumption of the battery and the threshold value for starting the engine.

8 Claims, 5 Drawing Sheets

(51) Int. Cl.
  *G05D 1/00*    (2006.01)
  *B60W 20/40*   (2016.01)
  *B60W 10/06*   (2006.01)
  *B60W 10/08*   (2006.01)
  *B60W 10/26*   (2006.01)
  *B60W 20/13*   (2016.01)
  *B60L 11/18*   (2006.01)
  *B60K 6/48*    (2007.10)

(56) References Cited

FOREIGN PATENT DOCUMENTS

| | | | |
|---|---|---|---|
| JP | 2010195350 A | * | 9/2010 |
| JP | 2010-280250 A | | 12/2010 |
| JP | 2011-068211 A | | 4/2011 |
| JP | 2012086685 A | * | 5/2012 |
| JP | 5715694 B2 | | 5/2015 |
| KR | 10-2014-0081696 A | | 7/2014 |
| KR | 10-2015-0001983 A | | 1/2015 |

* cited by examiner

DEVICE AND METHOD FOR CONTROLLING RUNNING MODE OF HYBRID ELECTRIC VEHICLE

CROSS-REFERENCE TO RELATED APPLICATION

This application claims priority to and the benefit of Korean Patent Application No. 10-2015-0092457 filed in the Korean Intellectual Property Office on Jun. 29, 2015, the entire contents of which are incorporated herein by reference.

BACKGROUND (a) Field of the Invention

The present invention relates to a device and a method for controlling a running mode of a hybrid vehicle, and more specifically, to a device and method for controlling a running mode of a hybrid vehicle based on actual power consumption.

(b) Description of the Related Art

A hybrid vehicle is a type of vehicle that uses two or more different types of power sources, and generally is driven by an engine that obtains a driving torque by burning a fuel and a motor that obtains a driving torque with battery power. The hybrid vehicle can be provided with the optimum output torque based on how the engine and the motor are operated while the vehicles are driven by the two power sources, that is, the engine and the motor.

A running mode of the hybrid vehicle includes an electric vehicle (EV) mode that uses the power from the motor, and a hybrid electric vehicle (HEV) mode using the torque from the engine as the main power and the torque from the motor as sub-power. The hybrid vehicle is capable of converting the EV mode into the HEV mode based on various conditions. In particular, the hybrid vehicle converts the EV mode into the HEV mode using a driving demand power being mechanical power. However, the mechanical power supplied by the battery is difficult to calculate, and an error may be generated according to motor efficiency and a load amount. Additionally, when the running mode is changed by the driving demand power, a temporary output shortage of the driving torque occurs, causing drivability to potentially be deteriorated.

The above information disclosed in this section is merely for enhancement of understanding of the background of the invention and therefore it may contain information that does not form the prior art that is already known in this country to a person of ordinary skill in the art.

SUMMARY

The present invention provides a device and a method for controlling a running mode of a hybrid vehicle having advantages of controlling the running mode of the hybrid vehicle based on actual power consumption.

An exemplary embodiment of the present invention provides a method for controlling a running mode of a hybrid vehicle that may include: monitoring power consumption of a battery when the hybrid vehicle is driven in an electric vehicle (EV) mode; calculating a threshold value for starting an engine; and determining whether to change the running mode of the hybrid vehicle by using the power consumption of the battery and the threshold value for starting the engine.

The monitoring of the power consumption may include measuring a battery current and a battery voltage while driving in the EV mode, and calculating the power consumption of the battery by multiplying the battery current and the battery voltage. The calculating of the threshold value may include calculating the threshold value by subtracting a predetermined margin value from a maximum discharging power of the battery. In particular, the predetermined margin value may be set using a time required to start the engine, output power of the engine, and an increasing rate of the power consumption. The determination of whether to change the running mode may include determining to convert the EV mode into a hybrid vehicle (HEV) mode when the power consumption of the battery exceeds the threshold value for starting the engine, and determining to maintain the EV mode when the power consumption of the battery does not exceed the threshold value (e.g., is less than the threshold value) for starting the engine.

An exemplary embodiment of the present invention provides a device for controlling a running mode of a hybrid vehicle that may include: a measuring unit configured to measure a control variation when the hybrid vehicle is driven in an electric vehicle (EV) mode; a calculation unit configured to calculate a power consumption of a battery or calculate a threshold value for starting an engine using the control variation; and a controller configured to determine whether to convert the EV mode into a hybrid vehicle (HEV) mode and control driving of the determined running mode.

The calculation unit may include a battery power consumption calculation unit configured to calculate the power consumption of the battery by multiplying a battery current and a battery voltage of the control variation. Additionally, the calculation unit may further include an engine starting threshold value calculation unit configured to calculate the threshold value by subtracting a predetermined margin value from a maximum discharging power of the battery, wherein the predetermined margin value is set using a time required to start the engine and a rising rate of the power consumption.

The controller may be configured to convert the EV mode into the HEV mode when the power consumption of the battery exceeds the threshold value for starting the engine. The controller may further be configured to maintain the EV mode when the power consumption of the battery is less than the threshold value for starting the engine. According to the present invention, by calculating actual power consumption during the driving of the hybrid vehicle and switching the running mode from the EV mode to the HEV mode, it may be possible to prevent the output shortage of the driving torque based on time required to start the engine, and prevent deterioration of drivability.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SYMBOLS

10: Engine
12: Motor
14: Transmission
16: Inverter
18: Battery
110: Measuring unit
120: Calculation unit
130: Control unit

DETAILED DESCRIPTION

In the following detailed description, exemplary embodiments of the present invention have been shown and described, simply by way of illustration. As those skilled in the art would realize, the described exemplary embodiments may be modified in various different ways, all without departing from the spirit or scope of the present invention. Parts indicated by like reference numerals are the same components throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
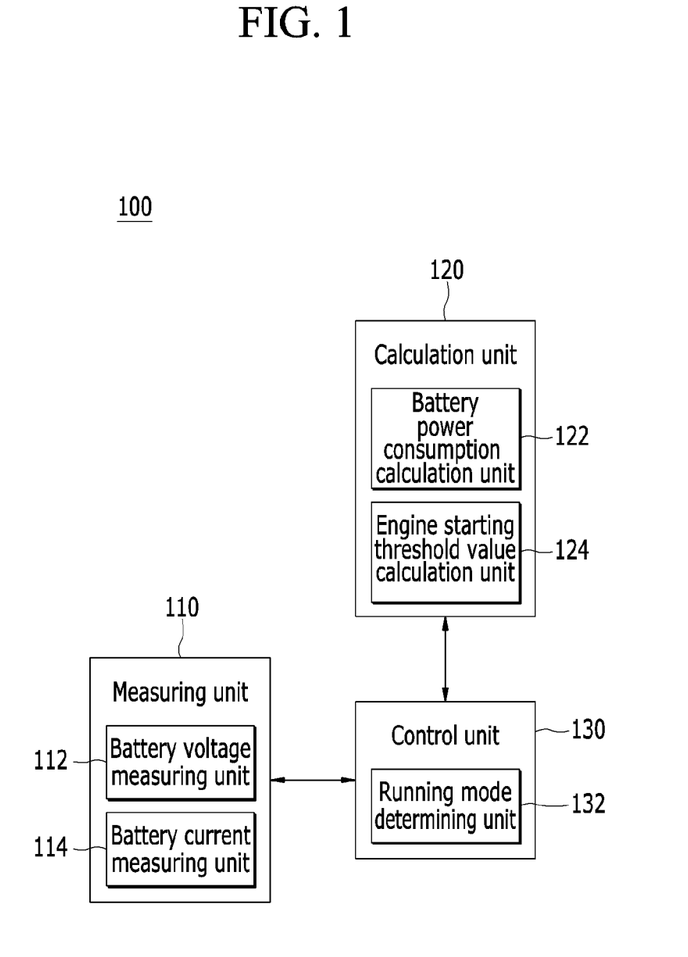
FIG. 1 is a diagram of a device for controlling a running mode of a hybrid vehicle according to an exemplary embodiment of the present invention.

A device and a method for controlling a running mode of a hybrid vehicle will now be described with reference to FIG. 1 to FIG. 5. FIG. 1 is a diagram of a device for controlling a running mode of a hybrid vehicle according to an exemplary embodiment of the present invention. In particular, for convenience of explanation, a configuration of the device for controlling the running mode of the hybrid vehicle according to the exemplary embodiment of the present invention is schematically illustrated, but the device for controlling the running mode of the hybrid vehicle is not limited thereto.

Referring to FIG. 1, a device 100 for controlling the running mode of the hybrid vehicle according to an exemplary embodiment of the present invention may include a measuring unit 110, a calculation unit 120, and a controller 130 (e.g., control unit). The controller 130 may be configured to operate the measuring unit 110, the calculation unit 120, and components thereof.

Particularly, the hybrid vehicle may be configured to use an engine and a motor as power sources, and transmit the power of the engine or the power of the motor to the vehicle wheels, or transmit the power of the engine and the power of the motor to the vehicle wheels. Further, the running mode of the hybrid vehicle may include an EV mode that uses the power from the motor, and an HEV mode using the torque from the engine as the main power and the torque from the motor as sub-power.

The measuring unit 110 may be configured to measure control variations during the driving of the hybrid vehicle, and provide the control variations to the calculation unit 120 or the controller 130. The measuring unit may be configured of one more multiple sensors. The control variations may include a battery voltage, a battery current, a maximum discharging power of the battery, and a time required to start the engine. The maximum discharging power of the battery may include a discharge limitation value of the battery, and a time required to start the engine may include a time required until outputting power after the engine is started.

In addition, the measuring unit 110 may include sub-components such as a battery voltage measuring unit 112 and a battery current measuring unit 114 according to an exemplary embodiment of the present invention. The battery voltage measuring unit 112 may be configured to measure a voltage value of the battery in the EV mode, and the battery current measuring unit 114 may be configured to measure a current value of the battery in the EV mode.

Further, the calculation unit 120 may be configured to calculate a power consumption of the battery, or calculate a threshold value for starting the engine using the control variations. The power consumption may include a power value consumed or used by the battery in the EV mode. The calculation unit 120 may include sub-components such as a battery power consumption calculation unit 122 and an engine starting threshold value calculation unit 124 according to an exemplary embodiment of the present invention.

In particular, the battery power consumption calculation unit 122 may be configured to calculate the power consumption of the battery by multiplying the battery current and the battery voltage of the control variations. The engine starting threshold value calculation unit 124 may be configured to calculate the threshold value by subtracting a predetermined margin value from a maximum discharging power of the battery. The predetermined margin value may be set using a time required to start the engine and a rising rate (e.g., an increasing rate) of the power consumption. The rising rate of the power consumption may include a differentiation value of the power consumption which is increased or decreased based on time.

The controller 130 may be configured to determine whether to switch the running mode using the power consumption of the battery and the threshold value for starting the engine, and may be configured to drive the motor and the engine by the determined running mode. Accordingly, the controller 130 may be implemented with at least one processor operated by a predetermined program, and the predetermined program may be programmed to perform each step according to a method for controlling the running mode of the hybrid vehicle according to an exemplary embodiment of the present invention. Further, the controller 130 may include a running mode determining unit 132 according to an exemplary embodiment of the present invention.

The running mode determining unit 132 may be configured to determine whether to switch the running mode of the hybrid vehicle using the power consumption of the battery and the threshold value for starting the engine. Additionally, the running mode determining unit 132 may be configured to determine to convert the EV mode into the HEV mode when the power consumption of the battery exceeds (e.g., is greater than) the threshold value for starting the engine, and the running mode determining unit 132 may be configured to determine to maintain the EV mode when the power consumption does not exceed (e.g., is less than) the threshold value.

Figure 2:
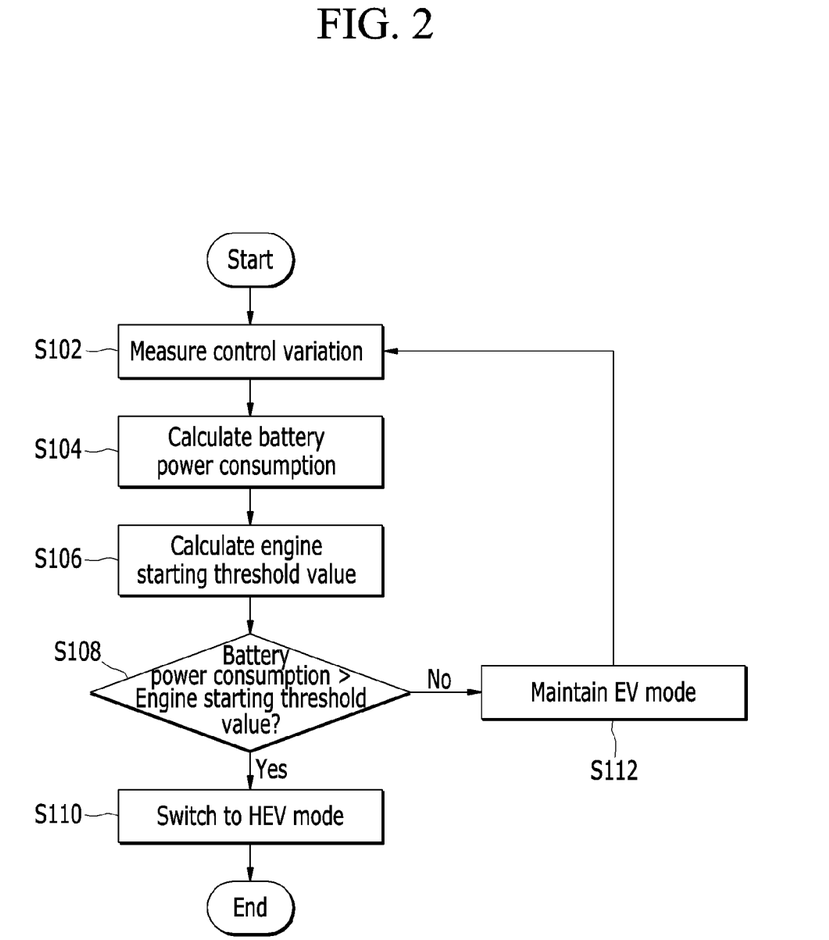
FIG. 2 is a flowchart briefly showing a process of controlling a running mode of the hybrid vehicle according to an exemplary embodiment of the present invention.

FIG. 2 is a flowchart briefly showing a process of controlling a running mode of the hybrid vehicle which may be executed by the controller 130, according to an exemplary embodiment of the present invention. The flowchart will be described with the same reference numerals as those of a configuration of FIG. 1.

Referring to FIG. 2, the device for controlling the running mode of the hybrid vehicle according to an exemplary embodiment of the present invention may be configured to measure control variations during the driving of the hybrid vehicle at step S102. Particularly, the control variations may include a battery voltage, a battery current, a maximum discharging power of the battery, and a time required to start the engine. The device for controlling the running mode of the hybrid vehicle may further be configured to measure the battery voltage and the battery current in the EV mode.

The device may then be configured to calculate the consumption of power of the battery that is actually consumed during the driving to the EV mode at step S104. The power consumption of the battery may be calculated by multiplying the battery voltage and the battery current. Additionally, the device may be configured to calculate the threshold value for starting the engine at step S106. In particular, the threshold value for starting the engine may be calculated by subtracting a predetermined margin value from a maximum discharging power of the battery. The predetermined margin value may be set using a time required to start the engine and output power of the engine and a rising rate of the power consumption.

Furthermore, the device may be configured to determine whether to change the running mode of the hybrid vehicle using the power consumption of the battery and the threshold value for starting the engine at step S108. Then the device may be configured to determine to convert the EV mode into the HEV mode when the power consumption of the battery exceeds the threshold value for starting the engine, and request the starting the engine at step S110. When the power consumption of the battery does not exceed the threshold value for starting the engine, the device may be configured to maintain the EV mode at step S112.

Figure 3:
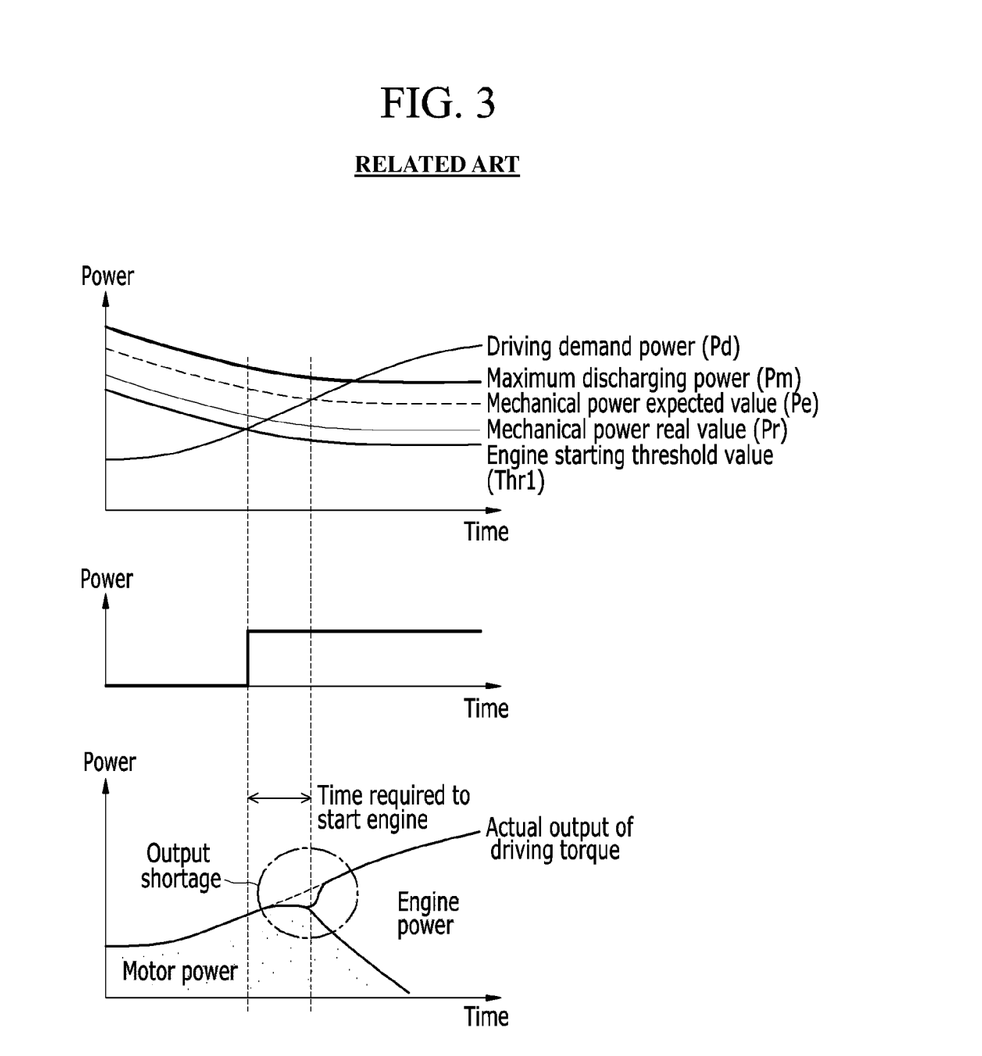
FIG. 3 is a graph showing an output shortage by motor efficiency error according to the related art.

FIG. 3 is a graph showing an output shortage by motor efficiency error, according to the related art. As shown in FIG. 3, in the related art, when a driving demand power Pd exceeds a threshold value Thr1 for starting the engine, the running mode is changed from the EV mode to the HEV mode, and the engine is started. Particularly, the driving demand power Pd is mechanical power, and includes a driver demand power which is calculated using the information signal related to the running state of the vehicle.

However, the mechanical power supplied by the battery is difficult to calculate, and an error may be generated according to motor efficiency and a load amount. A power difference may also be generated between an expected value of the mechanical power and a real value of the mechanical power. Accordingly, as shown in FIG. 3, when the running mode is changed by the driving demand power, a temporary output shortage of the driving torque occurs, such that drivability may deteriorate.

Figure 4:
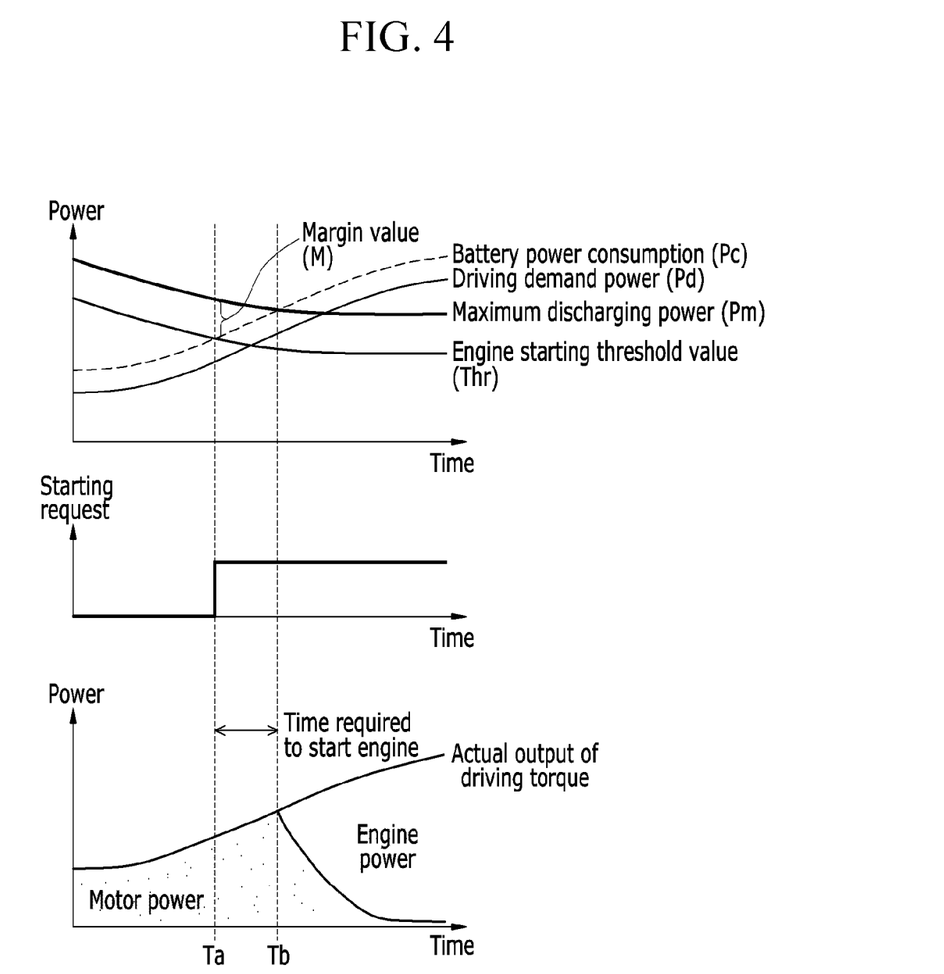
FIG. 4 is a graph used to solve the output shortage of FIG. 3 by switching the running mode of the hybrid vehicle according to an exemplary embodiment of the present invention.

FIG. 4 is a graph used to solve the output shortage of FIG. 3 by switching the running mode of the hybrid vehicle according to an exemplary embodiment of the present invention. Referring to FIG. 4, the device for controlling the running mode of the hybrid vehicle according to an exemplary embodiment of the present invention may be configured to determine the running mode using the power consumption Pc that is consumed from the battery.

The power consumption Pc of the battery may be calculated by multiplying the battery current and the battery voltage, and the threshold value Thr may be calculated by subtracting a predetermined margin value M from a maximum discharging power Pm. A predetermined margin value M may be set using a time Tb-Ta required to start the engine and a rising rate of the power consumption Pc. Accordingly, the method for controlling the running mode of the hybrid vehicle according to an exemplary embodiment of the present invention may be capable of preventing the output shortage of the driving torque by changing the running mode based on the power consumption Pc of the battery, the time Tb-Ta required to start the engine, and the rising rate of the power consumption Pc.

Figure 5:
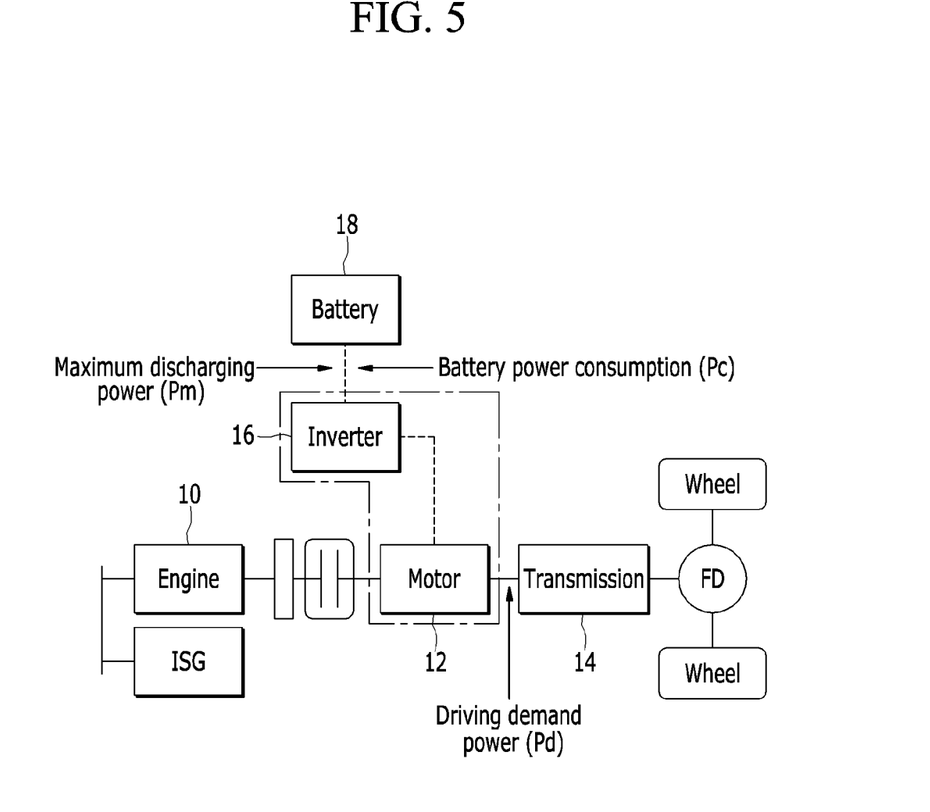
FIG. 5 a diagram showing a hybrid system applicable to a method for controlling the running mode of the hybrid vehicle according to an exemplary embodiment of the present invention.

FIG. 5 a diagram showing a hybrid system that is applicable to a method for controlling the running mode of the hybrid vehicle according to an exemplary embodiment of the present invention. As shown in FIG. 5, the hybrid system according to an exemplary embodiment of the present invention may include an engine 10, a motor 12, a transmission 14, an inverter 16, and a battery 18.

In the related art, the starting of the engine 10 is determined based on efficiency of the motor 12 and the inverter 16 to prevent the driving demand power Pd from exceeding the maximum discharging power Pm of the battery 18. The efficiency of the motor 12 and the inverter 16 varies based on the operation condition, and hence the error may be increased such that drivability may deteriorate.

However, the method for controlling the running mode of the hybrid vehicle according to an exemplary embodiment of the present invention monitors the power consumption Pc of the battery during the driving in the EV mode, and operates the engine 10 such that the power consumption Pc does not exceed the maximum discharging power Pm of the battery 18. Accordingly, unlike the related art, in the method for controlling the running mode of the hybrid vehicle according to an exemplary embodiment of the present invention, the power consumption Pc and the maximum discharging power Pm may be compared at the same position, and as a result, an error may be minimized, and the system may be more stably controlled.

As described, the device for controlling the running mode of the hybrid vehicle according to an exemplary embodiment of the present invention may be configured to calculate actual power consumption during the driving of the hybrid vehicle and switch the running mode from the EV mode to the HEV mode. Therefore, it may be possible to prevent the output shortage of the driving torque based on time required to start the engine, and prevent deterioration of drivability.

The device for controlling the running mode of the hybrid vehicle according to an exemplary embodiment of the present invention may be capable of minimizing error based on the motor efficiency and the load amount by changing the running mode using the real battery power rather than the driving demand power.

The exemplary embodiment of the present invention described above is implemented not only by an apparatus and a method, but also by a program realizing a function corresponding to a configuration of the exemplary embodiment of the present invention or a recording medium recording the program. While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a running mode of a hybrid vehicle, comprising:
   monitoring, by a controller, consumption power of a battery when the hybrid vehicle is driven in an electric vehicle (EV) mode;
   calculating, by the controller, a threshold value for starting an engine; and
   determining, by the controller, whether to change the running mode of the hybrid vehicle using the consumption power of the battery and the threshold value for starting the engine,
   wherein the monitoring of the consumption power includes:
      measuring, by the controller, a battery current and a battery voltage while driving in the EV mode, and
      calculating, by the controller, the consumption power of the battery by multiplying the battery current and the battery voltage,
   wherein the calculating of the threshold value includes:
      calculating, by the controller, the threshold value by subtracting a predetermined margin value from a maximum discharging power of the battery, and
   wherein the predetermined margin value is set using a time required to start and output power of the engine and a rising rate of the consumption power.

2. The method of claim 1, wherein the determining of whether to change the running mode includes:
   determining, by the controller, to convert the EV mode into a hybrid vehicle (HEV) mode when the consumption power of the battery exceeds the threshold value for starting the engine; and
   determining, by the controller, to maintain the EV mode when the consumption power of the battery is less than the threshold value for starting the engine.

3. A device for controlling a running mode of a hybrid vehicle, comprising:
   a memory configured to store program instructions; and
   a processor configured to execute the program instructions, the program instructions when executed configured to:
      measure a control variation including a battery voltage, a battery current, a maximum discharging power of the battery, and a time required to start the engine when the hybrid vehicle is driven in an electric vehicle (EV) mode;
      calculate consumption power of a battery and calculate a threshold value for starting an engine using the control variation;
      determine whether to convert the EV mode into a hybrid vehicle (HEV) mode, and execute driving of the determined running mode;
   wherein the program instructions when executed are further configured to:
      calculate the consumption power of the battery by multiplying a battery current and a battery voltage of the control variation; and
      calculate the threshold value by subtracting a predetermined margin value from a maximum discharging power of the battery,
      wherein the predetermined margin value is set using a time required to start the engine and a rising rate of the consumption power.

4. The device of claim 3, wherein the program instructions when executed are further configured to convert the EV mode into the HEV mode when the consumption power of the battery exceeds the threshold value for starting the engine.

5. The device of claim 4, wherein the program instructions when executed are further configured to maintain the EV mode when the consumption power of the battery is less than the threshold value for starting the engine.

6. A non-transitory computer readable medium containing program instructions executed by a controller, the computer readable medium comprising:
   program instructions that measure a control variation including a battery voltage, a battery current, a maximum discharging power of the battery, and a time required to start the engine when a hybrid vehicle is driven in an electric vehicle (EV) mode;
   program instructions that calculate consumption power of a battery and calculate a threshold value for starting an engine using the control variation;
   program instructions that determine whether to convert the EV mode into a hybrid vehicle (HEV) mode, and execute driving of the determined running mode; and
   program instructions that calculate the threshold value by subtracting a predetermined margin value from a maximum discharging power of the battery,
   wherein the predetermined margin value is set using a time required to start the engine and a rising rate of the consumption power.

7. The non-transitory computer readable medium of claim 6, further comprising:
   program instructions that convert the EV mode into the HEV mode when the consumption power of the battery exceeds the threshold value for starting the engine.

8. The non-transitory computer readable medium of claim 6, further comprising:
 program instructions that maintain the EV mode when the consumption power of the battery is less than the threshold value for starting the engine.

\* \* \* \* \*